Patented Feb. 10, 1942

2,272,668

UNITED STATES PATENT OFFICE 2,272,668

PARTIAL PHOSPHORIC ESTERS AND PROCESS FOR PREPARING SAME

Herbert Hönel, Detroit, Mich., assignor, by mesne assignments, to Reichhold Chemicals, Inc., Detroit, Mich., a corporation of Delaware No Drawing. Application November 10, 1939, Serial No. 303,917. In Germany February 10, 1939

15 Claims. (Cl. 260—403)

My invention relates to the preparation of new partial esters of phosphoric acids, which are characterized by a more or less resinous nature evidently due to high molecular complexity. In virtue of their acidic nature they are useful as accelerators for the hardening reaction of thermo-setting resins which at the same time are considerably improved by the plasticizing capacity of my new products.

More particularly my invention consists in interacting phosphorus pentoxide with polyvalent hydroxy compounds, either alone or in mixture with monovalent ones, at ordinary or elevated temperature.

The formation of esters by the interaction of phosphorus pentoxide with alcohols is well known. An equimolecular mixture of primary and secondary phosphate is obtained according to the scheme:

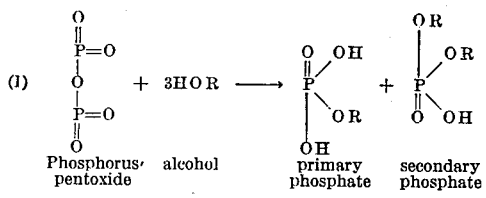

Phosphorus pentoxide, alcohol, primary phosphate, secondary phosphate

In this reaction the phosphorus pentoxide is split up in two parts, one of which interacts with two hydroxy groups, in other words this reaction is partly polyfunctional. By replacing the monofunctional monovalent hydroxy compound shown in the Formula I by a polyfunctional polyhydroxy compound, e. g. a trihydric alcohol, conditions are realized which cause the formation of esterification products characterized by a molecular size of substantially higher order than that of the components employed. This becomes apparent by a very considerable increase of the viscosity during the reaction, which even may lead to a gelly mass. The intensity of the phenomenon depends upon the number of hydroxy groups in the molecule of the alcoholic compound employed and upon the proportions chosen.

When diminishing the proportion of the alcoholic component to that corresponding to only two hydroxy groups instead of three per each molecule of phosphorus pentoxide, I believe that secondary esters of the pyrophosphoric acid are formed (according to Scheme II) rather than a mixture of primary phosphate and metaphosphate (see Scheme III).

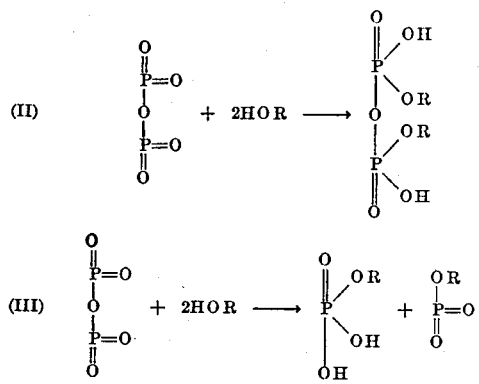

In Scheme II the phosphorus pentoxide acts exclusively as a polyfunctional component, in Scheme III however only as a monofunctional one, which could not lead to high molecular compounds by replacing the monohydric alcohol by a polyhydric one.

The spontaneous formation of relatively high molecular (partial) esters from phosphorus pentoxide and suitable proportions of polyhydroxy compounds is in some way analogous to that of the so-called alkyd resins where also relatively high molecular products are formed from comparatively low molecular compounds due to multicondensation (being exclusively based on esterification). The molecular complexity becomes the greater the larger the number of interacting points. According to Scheme II the phosphorus pentoxide acts the part of a dibasic carboxylic acid in the alkyd resin formation. According to Scheme I it behaves analogous to a mixture of a dibasic and a monobasic carboxylic acid.

Many commercially available polyhydroxy compounds, mostly of alcoholic nature, are well adapted for my process. Tertiary alcoholic compounds however are not suitable since they tend too much to decomposition when brought in contact with strongly dehydrating agents as is the case with phosphorus pentoxide. Compounds with secondary and primary alcoholic groups or phenolic hydroxy groups are sufficiently stable, i. e. the esters formed stand the temperatures occurring or employed during the reaction, and are therefore well adapted for my process. Reaction temperatures from room temperature up to 60–80° C. may in general be used, the color however being the darker the higher the temperature employed. Compounds carrying only phenolic hydroxy groups may even be reacted considerably above 100° C.

My process may be carried out in the presence of an inert solvent such as aliphatic or aromatic hydrocarbons, ethers or chlorinated solvents, such as carbon tetrachloride, ethylene chloride, etc. It is especially advisable to wet the phosphorus pentoxide with the inert solvent prior to its interaction with the alcoholic compound.

I have investigated the interaction of phosphorus pentoxide with different glycols being available in the trade, such as ethylene glycol, di- and tri-ethylene glycol, propylene glycol, dipropylene glycol, butylene glycol, furthermore with long chain glycols, such as 1,9-octadecadiol (obtained from ricinoleic acid by catalytical hydrogenation). The glycols have been employed either alone or in mixture with monohydric alcohols, such co-employment being suitable if high melting polyhydroxy compounds are used.

My investigation further has been extended to phenolic hydroxy compounds, both mononuclear, such as dihydroxy benzenes, and polynuclear, such as dihydroxy naphthalines, etc. or di-phenylol methane, -propane, -menthane, etc.; further also to novolak resins which ought to be considered as polyphenolic compounds of a higher order.

A trivalent alcoholic compound, the behaviour of which I particularly studied, is castor oil which substantially consists of the triglyceride of ricinoleic acid (a hydroxy acid). I have found that an insoluble mass is obtained if less than about 4½ parts of castor oil are employed per 1 part of phosphorus pentoxide. Very pale colored, highly viscous, soft resins are obtained by increasing the proportion of castor oil to 6-7 parts. In this case per 1 molecule of the phosphorus pentoxide about three hydroxy groups are present which corresponds to the schematic Formula I given above, whilst 4½ parts of castor oil correspond to the Scheme II. Of course, it will be understood that the total number of hydroxy groups per one molecule of phosphorus pentoxide should not substantially deviate from the conditions indicated in Scheme II or at least in Scheme I, if the largest possible molecular complexity is aimed at. Just as is the case in alkyd resins, the polyhydroxy compound, when employed in large excess over the equivalent proportion, functions only like a monovalent one.

The products obtained according to my invention are generally soluble in alcohol, butanol, acetone, except those of gelly appearance, which are not soluble at all. The products derived from short chain glycols are also soluble in water, whilst those obtained from long chain compounds, e. g. from octadecadiol, castor oil, hydrogenated castor oil, are entirely insoluble in water, but soluble in alcohols, benzene hydrocarbons and to some extent also in petroleum hydrocarbons. The last mentioned products are of particular interest when used as accelerators since their insolubility in water becomes apparent by a fair resistance to moisture in the hardened mass finally obtained.

The following examples are intended to further illustrate my invention.

Example 1

71 grams of phosphorus pentoxide are wetted with about 30 grams of ether and slowly added to 75 grams of triethylene glycol with stirring. The temperature may be allowed to rise slightly above the boiling point of the ether which evaporates. After constant stirring at 40-50° C. for ½ hour, 50 grams of anhydrous alcohol are added and the heating continued until a clear reaction mass is obtained. After evaporating the alcohol which did not enter the reaction with diminished pressure, 169 grams of a colorless, sirupy mass are obtained. It is soluble in alcohol in all proportions and stands addition of a multiple proportion of water without cloudiness. Thus it represents a very hydrophilic resinous product.

When omitting the alcohol or replacing by further 35-40 grams of triethylene glycol, a similar still more viscous mass is obtained.

Example 2

Hydrophobic sirupy esters are obtained when replacing the glycol and alcohol used in the foregoing example by water insoluble long chain compounds. A particularly long chain glycol is 1,9-octadecadiol, being offered to the trade as "Diolin" and obtained by catalytical reduction of castor oil fatty acids. E. g. 1 part of phosphorus pentoxide, after being wetted with toluene, is introduced in a solution of 2 parts of "Diolin" in 2 parts of toluene at about 50° C. with constant agitation. After about ½ hour 2 parts of isoamyl alcohol are added and heating is continued until a clear reaction mass is achieved. After evaporation of the amyl alcohol used in excess approximately 3.6 parts of a highly viscous oil are obtained which is soluble in alcohols, ketones, ester-like solvents and in aromatic hydrocarbons in various proportions and to some extent also in petroleum hydrocarbons.

Example 3

1 part of phosphorus pentoxide wetted with an inert solvent is thoroughly mixed under cooling with 7 parts of castor oil. Also in this case a highly exothermic reaction is noticeable. The temperature may be allowed to rise to about 70° C. Small, only difficulty soluble particles should be distributed in a suitable way, e. g. by driving the reaction mixture through a roller mill or the like. After evaporating the inert solvent a highly viscous, soft, very pale resin is obtained. It is entirely insoluble in water.

An extremely viscous resin is obtained when diminishing the proportion to about 4½ parts and operating in substantially the same way. A further reduction of the castor oil requires the coemployment of monohydric alcohols since otherwise a gelatinous reaction product results.

Products similar to those from castor oil are obtained from phosphorus pentoxide and hydrogenated castor oil, known in the trade under the name "Opalwax." The coemployment of an inert solvent for the latter is advisable.

Example 4

A balsamic alkyd resin prepared from 100 parts of phthalic anhydride, 70 parts of a technical mixture of low molecular fatty acids having an average acid value of about 400, 80 parts of glycerol (yield approximately 225 parts) is reacted with 15 parts of phosphorus pentoxide in the presence of 45 parts of benzene or carbon tetrachloride at temperatures up to 80° C. After finally removing the solvent a highly viscous resin is obtained which is soluble in alcohols or in aromatic hydrocarbons.

Example 5

Interaction products of phosphorus pentoxide and polyphenolic hydroxy compounds generally possess a much higher softening point than those deriving from aliphatic compounds. 70 grams of resorcinol are dissolved in ether and interacted with 60 grams of phosphorus pentoxide under reflux. The ester formed is poorly soluble in ether and precipitates. After evaporation of the ether a tough resinous product is obtained which is tackfree at ordinary temperature and soluble in alcohol, acetone, and water.

Quite similar products are obtained from brenzcatechol and hydroquinone.

Example 6

10 parts of phosphorus pentoxide are interacted with 16 parts of dihydroxy-diphenyl-dimethylmethane and 8 parts of p-tert. butylphenol in the presence of benzene which is finally driven off. An almost solid resin is obtained which is soluble e. g. in alcohol solvents, acetone, and to some extent in benzene and also in water. In diluted alkalies it is soluble in all proportions.

The dihydroxy compound employed in this example may be replaced by corresponding proportions of other polyphenolic compounds, e. g. diphenylol-butane, -cyclohexane, -menthane; the butylphenol by other homologues, e. g. cresols, xylenols, p-octylphenol etc. The products obtained are very similar to those described above, the hydrophilic character, however being the less pronounced the larger groups are present in the phenols employed.

What I claim is:

1. The process of producing resinous products which comprises interacting phosphorus pentoxide with organic polyhydroxy compounds in a proportion corresponding to at least 2 hydroxy groups but not substantially more than 3 hydroxy-groups per each molecule of the phosphorus pentoxide, in which process compounds having tertiary alcoholic groups are excluded.

2. A resinous acidic product derived from the reaction of phosphorus pentoxide and an organic polyhydroxy compound, reacted in a proportion corresponding to at least 2 hydroxy groups but not more than 3 hydroxy groups per each molecule of phosphorus pentoxide, compounds having tertiary alcoholic groups being excluded, said resinous product having a molecular size of substantially higher order than that of the original substances employed, and being adapted for use as an accelerator for the hardening reaction of thermo-setting resins, and as a resin plasticizer.

3. A product as set forth in claim 2 wherein the polyhydroxy compound employed is a glycol.

4. A product as set forth in claim 2 wherein the polyhydroxy compound is a phenolic hydroxy compound.

5. A substantially water insoluble product according to claim 2 obtained from long chain alcoholic compounds.

6. A resinous acidic product which is obtained by interacting at least 1 molecule but not substantially more than 1½ molecules of a glycol, with 1 molecule of phosphorus pentoxide, compounds having tertiary alcoholic groups being excluded.

7. A substantially water insoluble product according to claim 6, obtained from a long chain glycol.

8. A resinous acidic reaction product obtained by reacting $P_2O_5$ with castor oil in such proportion that at least 2 but not substantially more than 3 hydroxy groups are present per molecule of $P_2O_5$.

9. A substantially water insoluble, resinous acidic product obtained by interacting 1 part of phosphorus pentoxide with at least about 4½ parts, but not substantially more than about 7 parts of castor oil.

10. A process of producing an acid alkyl phosphate, which comprises reacting $P_2O_5$ and castor oil in substantially the proportions of one part by weight of $P_2O_5$ and seven parts by weight of the oil.

11. An acid alkyl phosphate obtained by reacting castor oil and $P_2O_5$ in substantially the proportions of one part by weight of $P_2O_5$ and seven parts by weight of the oil.

12. A light colored viscous acid alkyl phosphate obtained by reacting castor oil and $P_2O_5$ in substantially the proportions of one part by weight of $P_2O_5$ and 6–7 parts by weight of the oil.

13. A process of producing an acid alkyl phosphate, which comprises reacting $P_2O_5$ and castor oil in substantially the proportions of one part by weight of $P_2O_5$ and 6–7 parts by weight of the oil.

14. A process of producing an acid alkyl phosphate which comprises reacting $P_2O_5$ with castor oil in the proportion of one molecule of the $P_2O_5$ to about three hydroxy groups present in the oil.

15. A resinous acidic product obtained from interacting phosphorus pentoxide with polyvalent hydroxy compounds, in such proportion that at least 2 but not substantially more than 3 hydroxy groups are present per each molecule of phosphorus pentoxide, the hydroxy compound being phenolic.

HERBERT HÖNEL.